June 17, 1952  C. M. GRIFFIN  2,600,402
PANTOGRAPH MACHINE TOOL
Filed March 31, 1949  5 Sheets-Sheet 1

INVENTOR.
Cecil M. Griffin
BY
Christy, Parmelee & Strickland
attorneys.

INVENTOR.
Cecil M. Griffin

June 17, 1952 — C. M. GRIFFIN — 2,600,402
PANTOGRAPH MACHINE TOOL
Filed March 31, 1949 — 5 Sheets-Sheet 3

INVENTOR.
Cecil M. Griffin
BY Christy, Parmelee & Strickland
attorneys.

June 17, 1952     C. M. GRIFFIN     2,600,402
PANTOGRAPH MACHINE TOOL

Filed March 31, 1949     5 Sheets-Sheet 5

INVENTOR.
Cecil M. Griffin
BY

June 17, 1952 C. M. GRIFFIN 2,600,402
PANTOGRAPH MACHINE TOOL
Filed March 31, 1949 5 Sheets-Sheet 4

INVENTOR.
Cecil M. Griffin
BY
Christy, Parmelee & Strickland
attorneys

Patented June 17, 1952

2,600,402

UNITED STATES PATENT OFFICE 2,600,402

PANTOGRAPH MACHINE TOOL

Cecil M. Griffin, Pittsburgh, Pa.

Application March 31, 1949, Serial No. 84,562

10 Claims. (Cl. 51—100)

This invention relates to machines employing the pantograph method of controlling the feeding of work to a grinding wheel, or other cutter, in the process of forming profiles, or contours; especially precise and intricate contours required in making dies, tools, instruments and various fine machine parts.

This invention relates to a machine for shaping and finishing profiles and contours, particularly irregular and intricate profiles and contours which must be made to precise dimensions as required for example in the making of tools, dies and various fine machine parts, wherein the movements in bringing the work and grinding wheel or other tool or cutter together, generally termed "feed movements," are a replica on a reduced scale of the approach and contact between a pattern and a stylus as in the case of the well known pantograph method of reducing motions.

More particularly, this invention relates to a variation in the application of pantograph action wherein the work holder and the pattern holder are pivotally connected to the pantograph with pivot axes at the pantograph-defining points accomplishing a combination of angular movement about the pivot axis and bodily movement according to pantograph action of the work relative to the cutter whereby the highly desirable features of instant and infinite variation of the angle of the cutter relative to the work; which greatly facilitates the operation of shaping and finishing intricate profiles, and having the cutter in a fixed position on a common support with the pantograph "ray center" pivot are provided.

The ability to readily vary the angle of the cutter with the work not only provides great flexibility in the finishing of profiles, but makes it possible to complete jobs at one setting and with one cutter. Additionally the cutting tool or cutting wheel can be used to its best advantage to gain faster and smoother finishing and longer life of the cutter because the flexibility of my invention enables more of the cutting to be done with the side faces or cheeks of the cutter or cutting wheel, saving the edge or point of the tool for operations where a well-defined edge is necessary, as in the shaping of inside corners. The invention finds especial application in connection with the operation of finishing profiles to precise dimensions by grinding.

While pantographs have heretofore been used to control the feed movements between work pieces and shaping tools, the present invention utilizes the pantograph in a new way to greatly simplify the mechanism while increasing the flexibility of its use.

My invention is more fully described in conjunction with the accompanying drawings which illustrate an embodiment thereof and diagrammatically show its operation. In the drawings.

Figure 1:
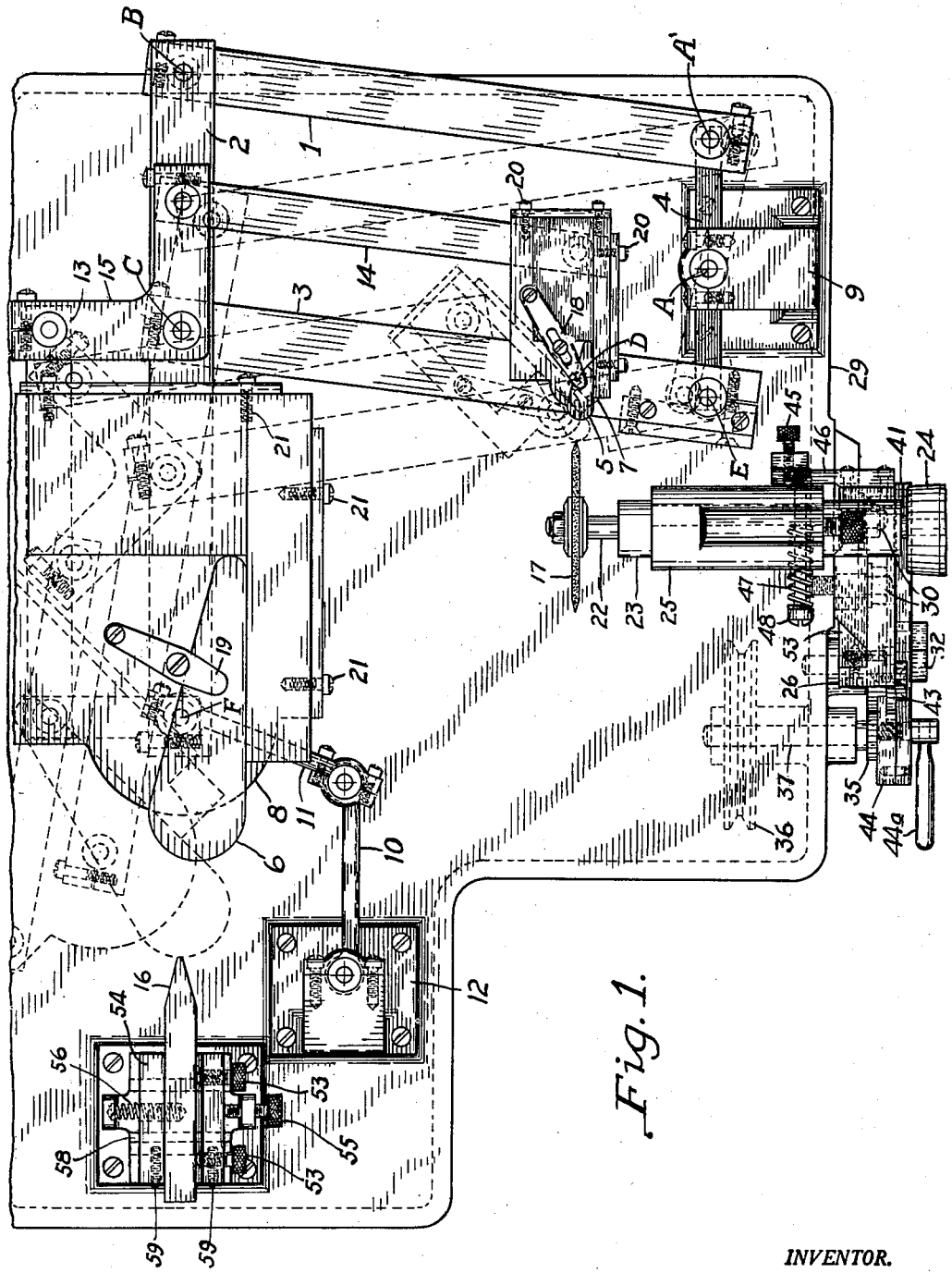
Fig. 1 is a plan view of a machine embodying my invention.

Referring to Fig. 1, the links 1, 2, 3 and 4 are pivoted together so that the pivot centers A'BCE become the vertices of a parallelogram. Also there is shown a work piece 5 and there is a template 6. These are mounted on the work-carrying rack 7 and the template-carrying rack 8, respectively. The links 13 and 14 connect the template rack 8 and the work rack 7, respectively, to the arms of a bell crank 15, and thereby keep the two racks 7 and 8 in parallel relation (radially situated) at all times. There is a stylus 16 supported for cooperation with the template; and 17 indicates a grinding wheel. The dotted lines showing the racks in angular positions with respect to the stylus 16 and grinding wheel or cutter 17 indicate how these links and bell crank operate to keep the racks parallel.

The work-carrying rack pivots about the center D, which is, by construction, on the line of centers CE, and the template-carrying rack pivots about the center F which is, by construction, on the line of centers BC. Also, the center F is, by construction, in line with AD.

This construction is such as will cause any transition movements of the pivot centers D and F to be precisely according to the geometric theorem defining the movements of the pencils of the scribing pantograph, which is defined as a machine for drawing a plane figure similar to a given plane figure (Plane Geometry, Book III, by Phillips and Fisher).

The Plane Geometry referred to above, shows that the linkages comprising the pantograph may be variously arranged and the same relative movements of the centers D and F obtained. These required relative movements are such that pivot center D will always be in the same straight line with A and F, and the ratio of the distances AD:AF will remain constant, and equal to the determining ratio of the pantograph, which is determined by the proportionate lengths of the links comprising the pantograph.

In the particular machine herewith described and illustrated, I have chosen to make the determining ratio 1 to 4. The same explanation would apply, however, if some other ratio, either greater or lesser, were used.

Machines embodying my invention will have the work and template carried on the movable pantograph linkage, and the cutter and stylus will be fixed members, whereas conventional pantograph machines have the cutter and stylus carried on the movable linkage, with the work and template the fixed members.

To prove the feasibility of my machine it is only necessary to prove that any corresponding points G and H (see Fig. 4) on the perimeters of the work and template fall on a straight line extending through the fixed point A, and that the ratio AG:AH=AD:AF=the determining ratio of the pantograph.

The proof: DG is parallel to FH and DG:FH=AD:AF (the work and template being radially situated and their ratio of similitude being as AD:AF). It also is apparent that the center of similitude or ray center of the work and pattern is at point A, the pivotal axis of the pantograph on the support.

Figure 4:
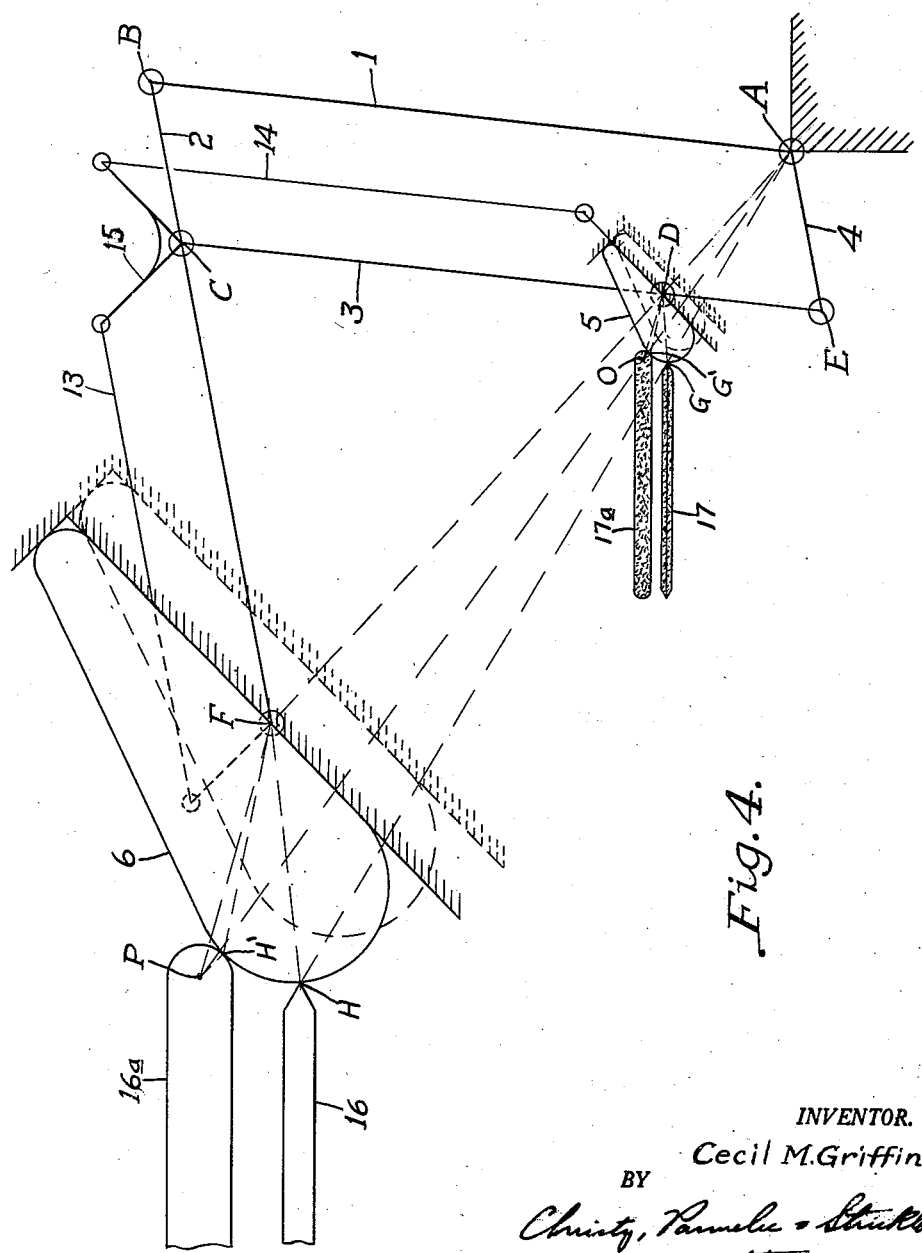
Fig. 4 is a diagram which simplifies the explanation of the basic nature of my invention.

In the case of blunt or rounded stylus and cutter—shown in Fig. 4, designated 16a and 17a—it can be shown that the stylus must be shaped similar to the cutter, and the two must have a ratio of similitude equal to the determining ratio of the pantograph.

Since the points G and H are any corresponding points on the perimeters of the work and template, it is seen that the cutter and stylus do not have to be located at particular positions, the only requirements being that they be in range of the pantograph, that they be aligned with the fixed pivot A, and that the ratio of their distances AG:AH=the determining ratio.

Two positions of the template and work relative to the pivot centers F and D are shown in the diagram, Fig. 4, the solid lines showing corresponding sides of the work and template even with the centers F and D, while dotted lines show the same corresponding sides "below" the pivot centers. The ratio of the distances from the pivot centers to the corresponding sides in each case, however, is equal to the 1 to 4 determining ratio. In the case of the sides even with the pivot centers, the explanation is that both 1×0 and 4×0=0.

Referring further to the drawings and diagram in which the various parts are designated by numerals, like numerals designating like parts in the different views, an embodiment of my invention comprises a pantograph having its fixed pivot axis A supported in the bracket 9, which is, in turn, supported by the base structure 29. Pivoted on the pantograph at pivot centers D and F, respectively, are the work-carrying rack 7 and the template-carrying rack 8. The work piece 5 and the template 6 are shown positioned by parallels which are, in turn, positioned by the side and end guide pieces attached to the racks by the screws 20 and 21. Clamps 18 and 19 hold the work piece and template, respectively, in their places.

My invention further contemplates an arrangement whereby the cutter 17 may be stroked across the edge of the work piece perpendicularly to the top of the supporting structure 29, or at an angle to the perpendicular. Other adjustments to compensate for wear of the cutter or other conditions are also provided. To this end, the grinding wheel 17, or other cutter, is mounted on and turned by the shaft 22, the shaft 22 being turned by the pulley 24 which is belted to a suitable motor. The shaft 22 is supported for rotation in bearings which are contained in the quill 23. Quill 23 is slidably held in a bore in the part 25, which is hinged on the slide 26 at the points 27. Part 26 is slidably supported, for rectilinear operation, on the rail 28, which is attached to the base structure 29 by the studs and nuts 30.

The assembly comprising the slide 26, the hinge part 25, pulley 24, quill 23, shaft 22, and the grinding wheel 17, is moved up and down (rectilinear) on the rail by means of the connecting rod 32, which connects a crank pin 33 with a wrist pin 40. The crank pin 33 is mounted on sector-shaped part 38, which is in turn mounted on the gear 34. The sector is pivoted on screw 39 and clamped in various pivoted positions on the gear 34 by a screw and clamp 39a. Thus the throw of the crank pin 33 may be varied, to vary the stroke of the grinding wheel, as the thickness of the work piece requires. The gear 34 is turned by the pinion 35, which is turned by the pulley 36 through the shaft 37, the pulley 36 being belted to a suitable driver.

The upper end of the connecting rod is connected to the wrist pin 40, which is mounted on the lever 41. Lever 41 is pivotally attached at one end to the slide 26 by the stud and bearing 42, the other end of the lever being adjustably clamped to the segment 43 by the clamp 44, which is tightened by the screw turned by the handle 44a, the segment 43 being attached to the slide 26 by the fastening screws 43a. This provides a means of elevating, or lowering, the slide 26, to elevate or lower the grinding wheel to suit work pieces of different thickness and heights.

The rail 28 may be angularly displaced from the perpendicular by pivoting it about the upper stud 30, as the slot 31 permits. This angular displacement provides a means of tapering the work, used, for example, in grinding clearances on cutting tools. Graduations 31a indicate the degree of angular displacement of the rail 28.

This method of tapering the work (stroking the cutter across the work, instead of the work across the cutter) provides for tapering all that part of the work operated on, at one setting. Whereas, in the case of the conventional pantograph machine, wherein the work is stroked across the cutter, and the only way to taper the work is to tilt it on its support, a taper in only one direction is accomplished at one setting.

Screw 45, threaded through the bracket 46 and extending to the hinged part 25, provides a means for feeding the grinding wheel toward and from the pantograph, as is necessary to position the wheel and to compensate for wear and dressing of the wheel. The part 25 is held against the screw 45 by the compression spring 47, which is compressed between the part 25 and the head of the screw, the screw 48 passing loosely through the part 25 and threading into the bracket 46.

Screw 49 moves the pin 50, and consequently the quill 23, for sidewise positioning of the grinding wheel, the screw 49 moving the pin 50 against the spring 51. Pin 50 is rigidly attached to the quill 23 and extends through the slot 52 into the bore containing the spring 51 and screw 49. The bore is threaded to receive the screw 49.

These two adjustments of the grinding wheel may be dispensed with by providing endwise and sidewise adjustment for the stylus 16, for, as was pointed out above, precise placement of the cutter and stylus in particular positions is not required; the only requirements being that the cutter and stylus be within range of the pantograph, that they be aligned with the fixed point A, and that the ratio of the distances AG:AH=the determining ratio. Since these conditions could be satisfied by moving either the stylus or the cutter, it follows that the means for positioning one of the two can be dispensed with. However, both systems of adjustment may be conjointly desirable, and in the drawings, I have shown adjustments for both stylus and cutter.

Figure 2:
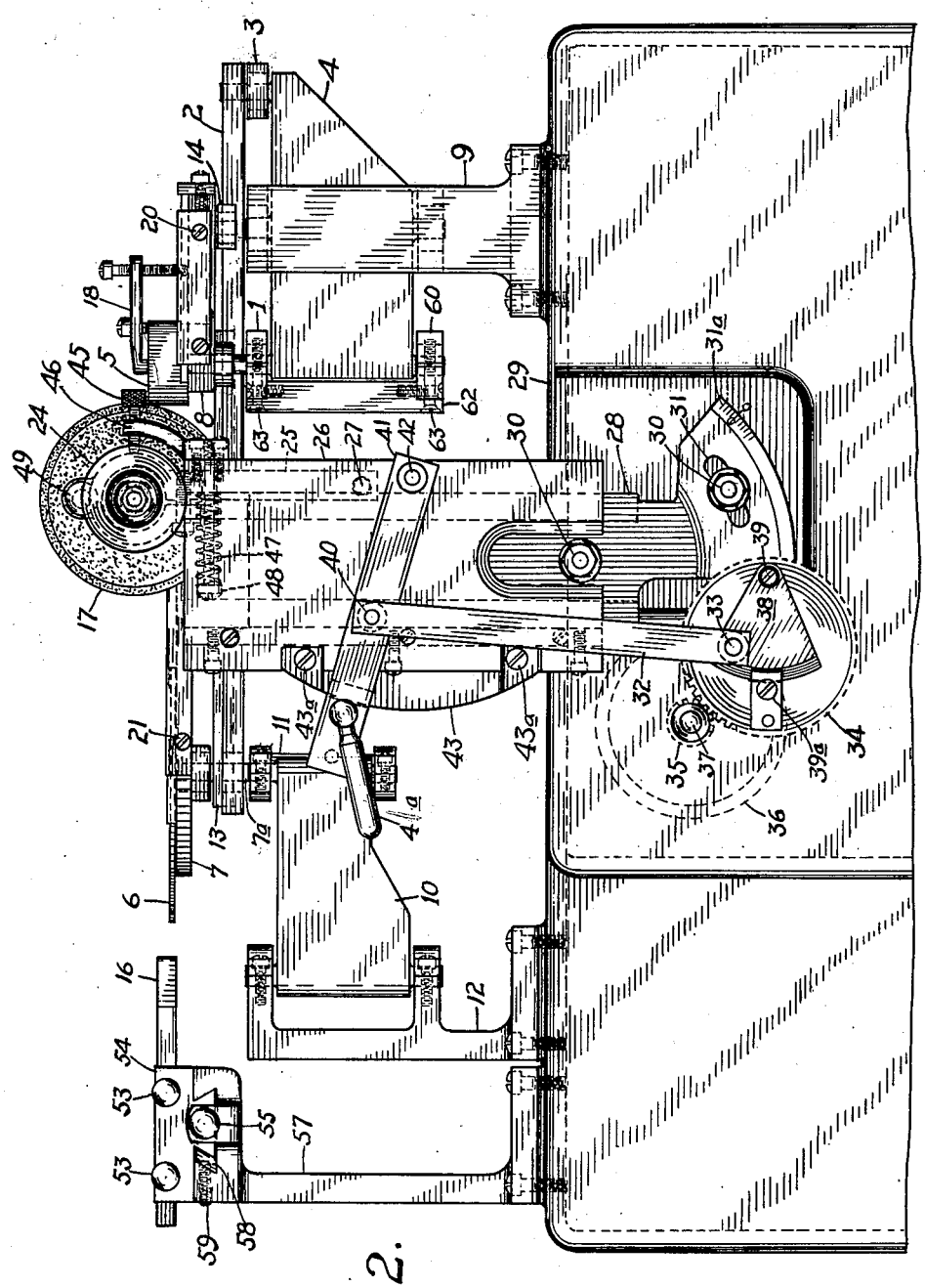
Fig. 2 is a side elevation of the machine shown in Fig. 1.

Endwise adjustment of the stylus is accomplished by loosening the clamping screws 53 and sliding the stylus 16 in the groove in which it rests in the block 54. The stylus is moved sidewise when the screw 55 is turned, forcing the block 54 sidewise against the spring 56. Block 54 is guided by the dovetail tongue fitted in the top of the pedestal 57 (see Fig. 2). Gib 58 and gib screws 59 are for taking up the slack and wear in the dovetail slide.

The pivot shafts at the centers D and F, supporting the work rack and template rack, respectively, must be maintained precisely perpendicular to the planes in which the pantograph linkages and the racks move. The pivot shaft at the center F, designated 7a, is kept perpendicular by a movable arm comprising articulated links 10 and 11. The pivotally fixed end of the link 10 of the arm is pivotally supported in bearings contained in the pedestal 12 attached to the base 29. Bearings in the pedestal 12 and those at the pivoting juncture of the links 10 and 11, and also those at the free end of the arm which supports the pivot shaft 7a, are precisely aligned so the axes of all three pivots are parallel, and are precisely perpendicular to the planes in which the pantograph linkage and the racks move.

This arm, comprising the articulated links 10 and 11, also serves to support the overhanging portion of the pantograph remote from pivot A against sagging.

Figure 3:
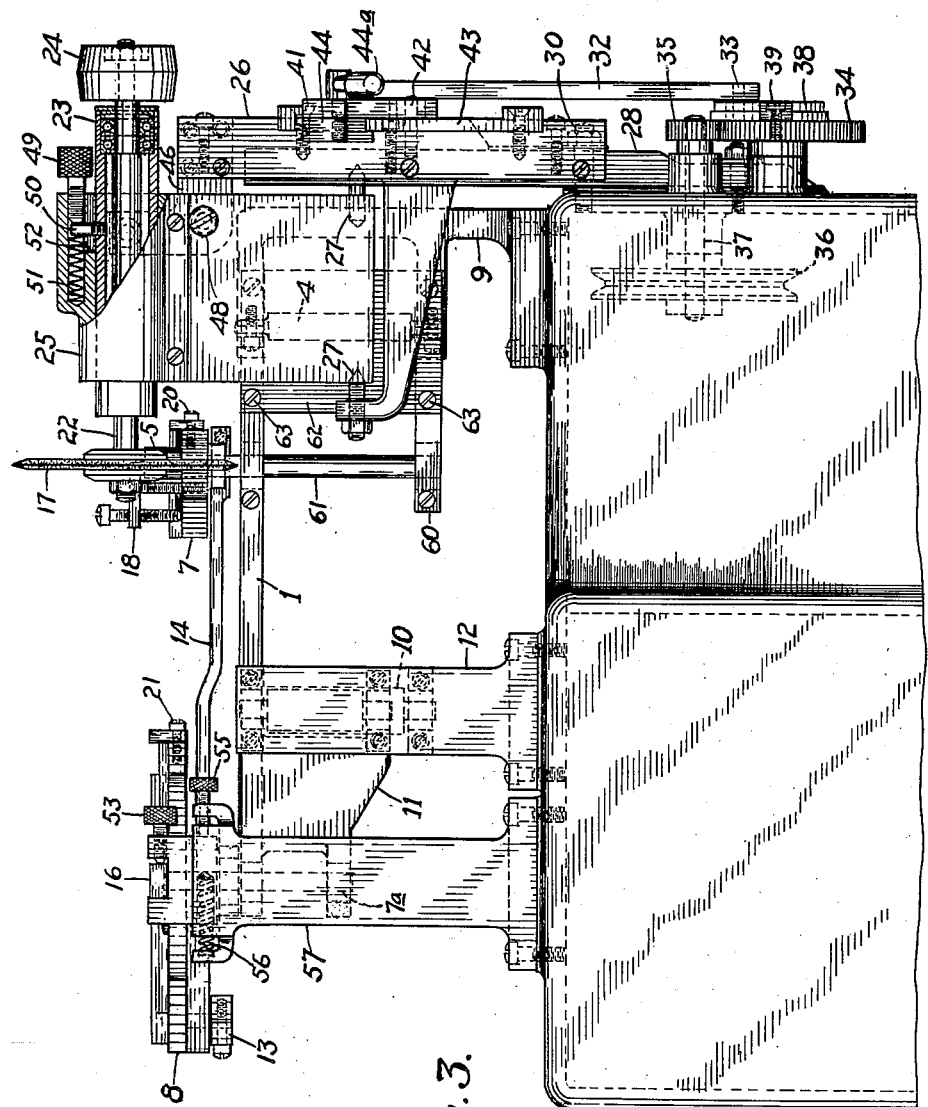
Fig. 3 is an end view of the machine shown in Fig. 1, with a part thereof in section.

The pivot shaft 61, having its axis at center D (see Fig. 3) is supported at its lower end in a bearing contained in the arm 60. Arm 60 is rigidly connected to link 3 by the plate 62 and the fastening screws 63. This lower bearing is aligned with the bearing in the link 3, to maintain the shaft 61 in precise perpendicular alignment.

The work rack and template rack are, respectively, solidly attached to the upper ends of the pivot shafts 61 and 7a.

No attempt has been made to show in detail the bearings for the various pivots. Suffice it to say that the machine built to test the feasibility of my invention had the pivots supported in ball bearings, which support the shafts both radially and longitudinally against any perceptible movement, and which I have found to be a practical expedient. Many brands of such bearings, sealed against grit and lubricated for life, are readily obtainable. The inner and outer circles shown on the drawings at pivot points represent the inner and outer diameters of such bearings.

Figures 5, 6:
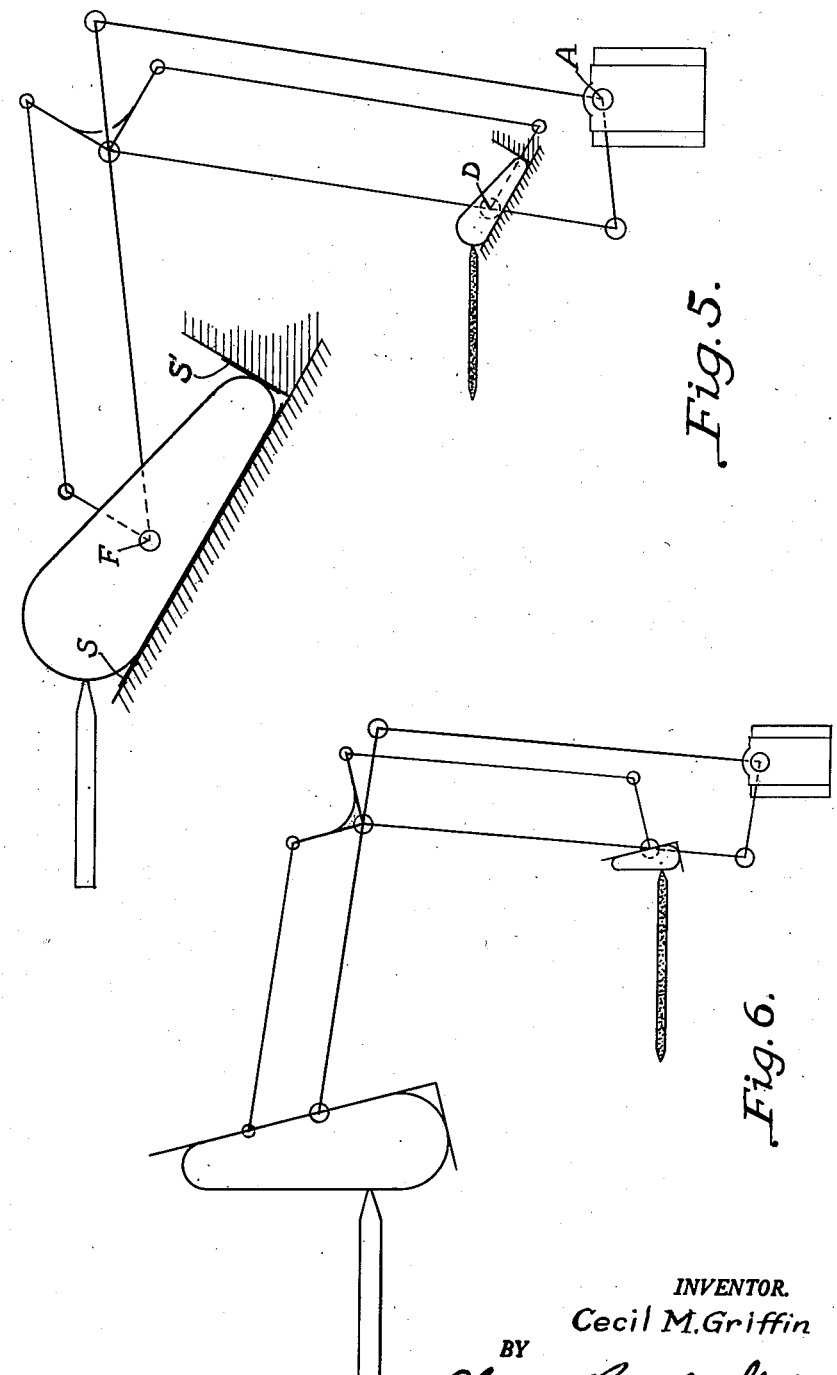
Figs. 5 and 6 are additional diagrams, used in explaining the use of my machine.

Spacing shims, designated S and S', Fig. 5, are used when the work is to be finished all around. The thickness of the shims would be four times the thickness of the finish allowance on the work when the ratio of similitude of the template and work is 4 to 1. When the work has been finished on the sides which are against the guides, the shims are removed.

The form of the grinding wheel or cutter must correspond exactly to that of the stylus tip in the same ratio as the work piece to template. It will be understood that a milling cutter might be used in place of a grinding wheel, or even a tool such as a planer bit could be stroked across the work piece.

When the cutter is a grinding wheel, it can be formed to the exact shape and ratio of similitude by dressing with a diamond mounted on the work rack of the pantograph machine. The position of the diamond on the rack is not critical, except that the distance "ahead" of the center D must be known to determine the distance ahead of the center F of the edges of a parallel serving as a template for the dressing operation. In other words, to dress the wheel, a diamond is mounted in the work-holding rack, and a piece having a straight edge is placed in the template-holding rack, with the straight edge "ahead" of the center F by an amount equal to the distance of the diamond "ahead" of the center D times the determining ratio of the pantograph. With the grinding wheel and stylus positioned, the operator will discover that the dressing operation requires only a matter of stroking the stylus with the straight-edge at all tangent positions. It will also be discovered that the shape of the diamond point is not critical—square, rounded, and sharp-pointed diamonds all producing the same wheel form. The foregoing would not apply if the stylus tips were undercut, and the straight-edge could not make contact at all points.

When using diamond grinding wheels, and other cutters which cannot be dressed, it is necessary to shape the stylus to conform to the shape of the grinding wheel, or other cutter.

While I have illustrated and described a specific embodiment of my invention, it will be understood that this is by way of explanation, and that various changes and modifications may be made in the construction and arrangement of parts within the contemplation of my invention and under the scope of the following claims. Furthermore, the size and design may be modified according to the character of the work to be done. Usually a machine as particularly disclosed will be used for the finish grinding of precise outlines required in making tool gauges and fine machine parts. Obviously my invention is not restricted to use in connection with grinding operations, but may also be advantageously employed in connection with such other operations as milling, shaping, filing and lapping.

I claim:

1. A pantograph machine of the class described comprising a supporting structure, a system of links pivotally mounted at one point on the supporting structure and constituting a pantograph, the pantograph linkage defining a parallelogram with one of the arms at the end of the parallelogram projecting to provide an extension, a template holder pivotally mounted on said extension, a work holder on the pantograph linkage having its point of pivotal mounting in a line extending between the pivotal axis of the template holder and the pivotal axis on which the pantograph is mounted on the support, a stylus on the support positioned to engage a template mounted in the template holder, a cutting machine in front of the work holder positioned to engage a work piece mounted on the work holder, and an articulated supporting arm pivotally carried on the support and to which the pantograph system is connected at a point which coincides with the pivotal axis of the template holder.

2. A mechanism for controlling feed movements between a work piece and a grinder or other shaping machine or tool, wherein the feed movements are a replica on a reduced scale of the approach and contact between an enlarged pattern and a stylus, said mechanism comprising a support, a pantograph linkage having the usual long arm, short arm and fixed positions maintained in aligned genuine pantograph action relation during operation, said pantograph linkage being pivotally attached at said fixed position to the support, a work holder pivotally connected to the linkage at the short arm and a pattern holder pivotally connected at the long arm positions, a stylus holder on the support to hold a stylus in a fixed position relative to the support during operation and within the range of movement of the pattern holder for contacting a pattern on the pattern holder, and means on the pantograph for keeping the work and pattern holders in constant parallel relation to each other during operation, said work and pattern holders, and accordingly work pieces and the corresponding pattern when in their operative positions on their respective holders, being angularly adjustable in infinite increments relative to the support about the axes at the pivotal connections of the holders with their respective pantograph positions.

3. A mechanism as defined in claim 2 wherein the means for keeping the holders in constant parallel relation to each other interconnects the work and pattern holders whereby any pivotal movement of either holder is equally and simultaneously transmitted to the other holder whereby the holders, and consequently a work piece and a pattern on the holders, will be maintained parallel to each other.

4. A mechanism as defined in claim 2 wherein the said holders are provided with guide parts to facilitate the placement of work pieces and patterns on the respective holders.

5. A machine for shaping and finishing work pieces according to enlarged patterns wherein the feed movements are a replica on a reduced scale of the movements in approach and contact between an enlarged pattern and a stylus comprising a support, a pantograph linkage having the usual long arm, short arm and fixed positions thereon maintained in aligned genuine pantograph relation as their disposition relative to each other varies during operation, said pantograph linkage being pivotally attached at said fixed position to the support, a work holder pivotally connected to the linkage at the short arm and a pattern holder pivotally connected at the long arm positions, a shaping tool holder and a stylus holder on the support to hold a shaping tool and a stylus respectively in separate fixed positions to contact a work piece on the work holder and a pattern on the pattern holder, and means on the linkage for keeping the work and pattern holders in constant parallel relation to each other during operation, said work and pattern holders, and accordingly work pieces and the corresponding pattern when in their operative positions on their respective holders, being angularly adjustable in infinite increments relative to the support about the axes at the pivotal connections of the holders with their respective pantograph positions.

6. A machine as defined in claim 5 wherein the means for keeping the holders in constant parallel relation to each other interconnects the work and pattern holders whereby any pivotal movement of either holder is equally and simultaneously transmitted to the other holder.

7. A machine as defined in claim 6 wherein the point profile of the stylus is similar to the point profile of the shaping tool with the ratio of their similitude being equal to the determining ratio of the pantograph and having their center of similitude contained in the axis of the pivot connection of the pantograph to the support.

8. A machine as defined in claim 7 wherein the stylus holder is adapted to adjustably support interchangeable stylus whereby the stylus may be matched to the shape and size of the shaping tool and positioned for alignment.

9. A machine as defined in claim 8 having means for imparting reciprocating movement to the shaping tool providing for stroking the shaping tool across the work piece.

10. A machine as defined in claim 9 wherein the shaping tool holder incorporates means of adjustment for deviating the direction of said reciprocating movement as a means of tapering the work piece.

CECIL M. GRIFFIN.

REFERENCES CITED

The following references are of record in the file of this patent:

UNITED STATES PATENTS

| Number | Name | Date |
|---|---|---|
| 2,030,850 | Atti | Feb. 18, 1936 |
| 2,038,455 | Studer | Apr. 21, 1936 |
| 2,171,211 | Day | Aug. 29, 1939 |
| 2,360,772 | Hedin | Oct. 17, 1944 |
| 2,488,088 | Marchant et al. | Nov. 15, 1949 |
| 2,521,958 | Angerby et al. | Sept. 12, 1950 |

FOREIGN PATENTS

| Number | Country | Date |
|---|---|---|
| 463,767 | Great Britain | Apr. 6, 1937 |